United States Patent
Ylönen et al.

(10) Patent No.: US 10,102,232 B2
(45) Date of Patent: Oct. 16, 2018

(54) STORING STRUCTURED INFORMATION

(71) Applicant: SSH Communications Security OYJ, Helsinki (FI)

(72) Inventors: Tatu J. Ylönen, Espoo (FI); Herb Goldman, Bear, DE (US)

(73) Assignee: SSH COMMUNICATIONS SECURITY OYJ, Helsinki (FI)

( * ) Notice: Subject to any disclaimer, the term of this patent is extended or adjusted under 35 U.S.C. 154(b) by 360 days.

(21) Appl. No.: 14/711,926

(22) Filed: May 14, 2015

(65) Prior Publication Data

US 2016/0335259 A1 Nov. 17, 2016

(51) Int. Cl.
| | |
|---|---|
| *G06F 7/00* | (2006.01) |
| *G06F 17/30* | (2006.01) |
| *G06F 21/62* | (2013.01) |
| *G06F 11/30* | (2006.01) |
| *G06F 21/55* | (2013.01) |
| *H04L 9/08* | (2006.01) |

(52) U.S. Cl.
CPC ...... *G06F 17/3033* (2013.01); *G06F 11/3055* (2013.01); *G06F 11/3079* (2013.01); *G06F 21/552* (2013.01); *G06F 21/6218* (2013.01); *H04L 9/08* (2013.01); *H04L 9/0891* (2013.01)

(58) Field of Classification Search
CPC .................................................. G06F 17/3033
See application file for complete search history.

(56) References Cited

U.S. PATENT DOCUMENTS

| | | | | |
|---|---|---|---|---|
| 5,742,809 A * | 4/1998 | Hayashi | ............ | G06F 17/30321 |
| 5,991,455 A * | 11/1999 | Choo | ...................... | G06T 9/008 |
| | | | | 375/240.22 |
| 6,023,510 A * | 2/2000 | Epstein | ................ | G06Q 20/383 |
| | | | | 380/285 |
| 6,212,183 B1 * | 4/2001 | Wilford | .................. | H04L 45/00 |
| | | | | 370/383 |
| 7,949,571 B2 * | 5/2011 | Fujimaki | ............ | G06Q 30/0601 |
| | | | | 705/26.1 |
| 8,051,205 B2 * | 11/2011 | Roy | ........................ | G06F 15/16 |
| | | | | 709/238 |
| 8,156,117 B2 * | 4/2012 | Krylov | .............. | G06F 17/30997 |
| | | | | 707/728 |

(Continued)

FOREIGN PATENT DOCUMENTS

WO    WO-2013093209 A1    6/2013

OTHER PUBLICATIONS

WO2013/093209A1.*

(Continued)

*Primary Examiner* — Daniel Kuddus
(74) *Attorney, Agent, or Firm* — Robert P. Michal, Esq.; Carter, DeLuca, Farrell & Schmidt, LLP

(57) ABSTRACT

Methods and apparatuses for storing structured information are disclosed. A hash value computed over structured information determined for a host is compared to a hash value computed over a corresponding structured information stored in a remote database for the host where after an update of at least a part of the stored structured information can take place in response to determining a difference in the hash values and the stored structured information is kept in the database as it is in response to determining that the hash values are equal.

17 Claims, 5 Drawing Sheets

(56) References Cited

U.S. PATENT DOCUMENTS

| | | | |
|---|---|---|---|
| 8,738,531 B1* | 5/2014 | Kalyadin | G06Q 20/1235 705/50 |
| 2011/0252418 A1* | 10/2011 | Havivi | G06F 9/50 718/1 |
| 2015/0222604 A1* | 8/2015 | Ylonen | H04L 63/062 713/171 |

OTHER PUBLICATIONS

Extended European Search Report issued by the European Patent Office in connection with European Application No. 16168056.6-1870 dated Jul. 12, 2016 (7 pages).

* cited by examiner

STORING STRUCTURED INFORMATION

FIELD OF THE INVENTION

This disclosure relates to storing of structured information, and more particularly to storing centrally up-to-date structured information for a plurality of hosts.

BACKGROUND

A data network can have a large number of computers and other entities connected therein. Devices such as user terminals and machine type terminals are often called as the host. The hosts can run a large number of various functionalities and features, such as security features that need to be controlled and administered. Various management applications have therefore been developed to provide assistance in operating a data network. A management application typically needs to collect substantial amounts of structured information such as data relating to configurations from a large number of computers and directories.

For example, systems for managing keys, for example Secure Shell (SSH) keys, need to collect information about hosts, user accounts on hosts, and keys configured for users on hosts frequently. Information related to authenticators such as SSH keys generally includes information about authentication and mounted file system configuration on a host. Information about local user accounts may also be included. Various configuration information for each user on the host can also be included. This can possibly include users defined in directories such as LDAP (Lightweight Directory Access Protocol) directories or Active Directory. For users, the information typically includes any identity keys and authorized keys configured for each user.

Collection of such information may be needed several times per day. Such systems may be used for managing large environments, even with millions of user accounts, including local accounts, and tens of thousands of computers. Thus the database storing this information can become very complex.

Often there is no change in the collected configuration information compared to earlier information. The amount of configuration information received from each host can also be substantial.

Parsing the configuration information, comparing it to previous information in a database, and updating a complex database to reflect any changes can cause significant load on the database, processor and memory usage. This is exacerbated by the potentially very large number of user accounts, hosts, and keys and/or other authenticators that may be present in large organizations.

Reduction in the amount of processing needed when handling new configuration information for hosts stored in a remote location would thus be desired.

The volume of data transfer for the configuration information updates can also be substantial. This can be especially the case if new information is obtained from hosts frequently. There can thus also be a desire to reduce the amount of data that needs to be transferred when the configuration information has not changed.

It is noted that the above discussed issues are not limited to any particular system and data processing apparatus but may occur in any system where collection and storing of updated structured data may be needed.

Embodiments of the invention aim to address one or several of the above issues.

SUMMARY

In accordance with an aspect there is provided a method comprising comparing a hash value computed over structured information determined for a host to a hash value computed over a corresponding structured information stored in a remote database for the host, the method further comprising one of causing update of at least a part of the stored structured information in response to determining a difference in the hash values, and keeping the stored structured information in the database in response to determining that the hash values are equal.

In accordance with an aspect there is provided an apparatus for controlling a database for storing structured information for a plurality of remote hosts, the apparatus comprising at least one processor, and at least one memory including computer program code, wherein the at least one memory and the computer program code are configured, with the at least one processor, to compare a hash value computed over structured information determined for a host to a hash value computed over a corresponding structured information stored for the host in the database, cause update of at least a part of the stored structured information in the database based on structured information received from the hosts in response to determination of a difference in the hash values, and keep the stored structured information in the database in response to determination that the hash values are equal.

In accordance with an aspect there is provided an apparatus in a computer system wherein structured information for a plurality of hosts is stored in a remote database, the apparatus comprising at least one processor, and at least one memory including computer program code, wherein the at least one memory and the computer program code are configured, with the at least one processor, to compare a hash value computed over current structured information for the host to a hash value computed over a corresponding structured information stored for the host in the remote database, and cause, in response to determination of a difference in the hash values, update of at least a part of the stored structured information for the hosts in the database based on said current structured information for the host, and refrain, in response to determination that the hash values are equal, from triggering an update of the stored structured information in the database.

In accordance with a more detailed aspect the structured information comprises configuration information. The configuration information can comprise at least one authenticator. The at least one authenticator may comprise a secure shell (SSH) key and the configuration information comprises at least one configuration file for SSH.

In accordance with an aspect structured information for the host is received in a data processing unit comprising the database and the hash values of the received and stored structured information are compared at the data processing unit. The hash value of the received structured information may be computed by the host or the data processing unit.

New structured information can be determined for the host by the host. The comparing of the hash values of the new and stored structured information can be provided by the host. The host can trigger an update of at least a part of the stored structured information in the database in response to determining a difference in the hash values. The hash value of the stored structured information can be determined by the host. Alternatively, the hash value can be received from the data processing unit comprising the database.

In accordance with an aspect the comparing is performed at a node separate from the host and a data processing unit comprising the database. The node can provide an interim node adapted to capture data communicated between the host and the database. The node can retrieve hash values computed based on the stored structured information from the database.

The database can be adapted to store hash values computed over structured information in response to determination by the comparison that the hash values differ.

A timestamp can be updated to indicate when structured information was last received from the host.

The structured information may be fully parsed in the database only if the hash values differ.

A hash value can be read from a database and communicated to the host, and the host can generate an indication that the hash values are equal or an indication that the hash values are not equal.

A plurality of configuration parameters extracted from the structured information and the hash value computed over at least a part of the structured information can be stored in the database in response to determining difference in the hash values.

A previously stored hash value can be communicated from the database to the host and the host can communicate to the database receiving an indication that such hash value for structured information matches a hash value for new structured information. In response to receiving new structured information from the host new parameters extracted from the structured information and a hash value determined for the structured information are stored in the database.

In accordance with an aspects a system comprising a plurality of hosts as described herein and at least one remote database as described herein is provided. Computer software products for implementing the disclosed methods in a host, a database node and a node separate from the host and the database node can also be provided.

Certain more detailed aspects are evident from the detailed description.

BRIEF DESCRIPTION OF THE DRAWINGS

Various exemplifying embodiments of the invention are illustrated by the attached drawings. Steps and elements may be reordered, omitted, and combined to form new embodiments, and any step indicated as performed may be caused to be performed by another device or module. In the Figures

DETAILED DESCRIPTION

Figure 1:
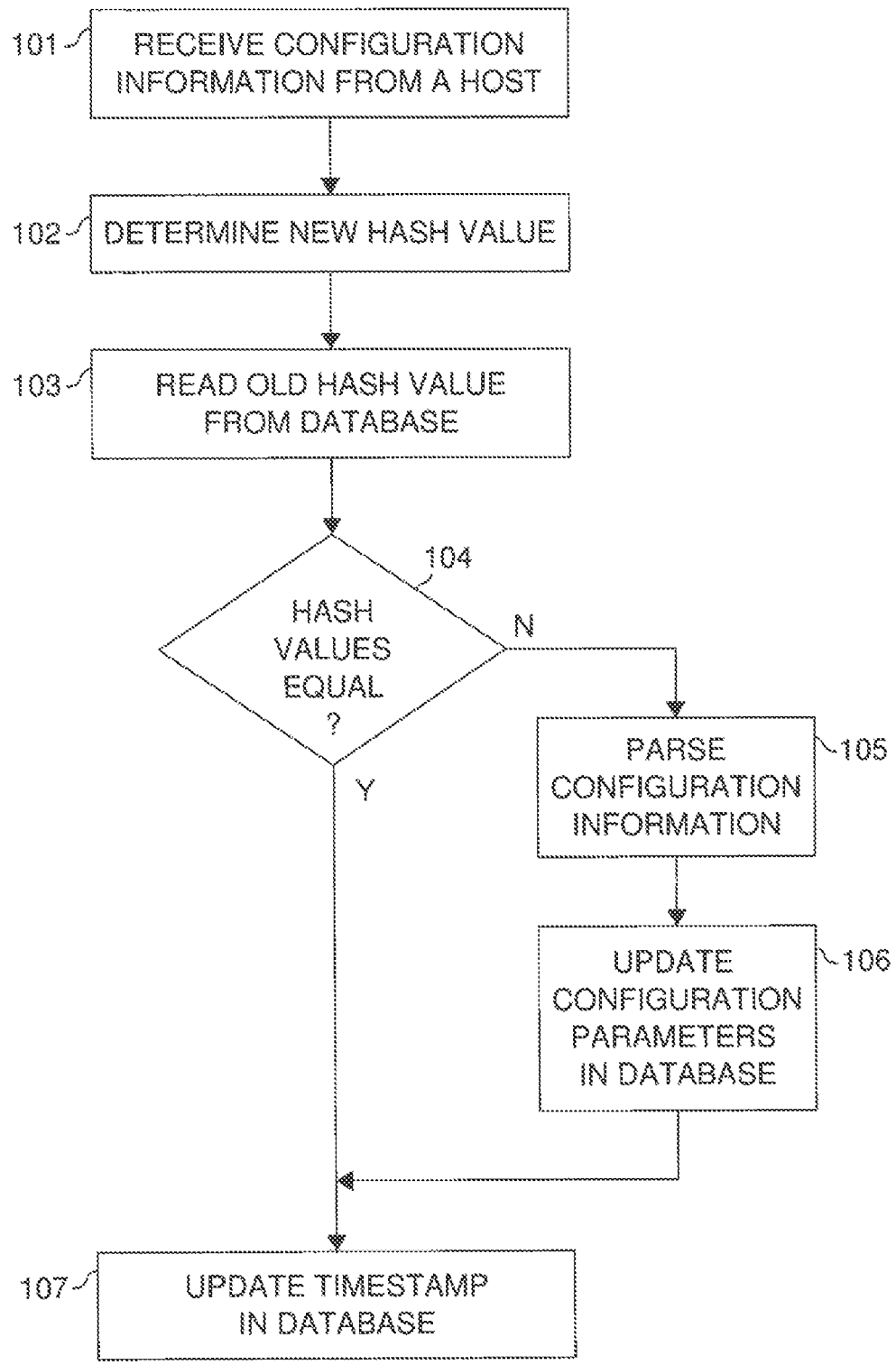
FIG. 1 illustrates using hash values over a part of configuration information collected from a host to prevent redundant database update.

Certain example of methods and apparatuses are presented herein making speeding up handling of structured information possible, in particular making the process of storing of structured information in a central database received from or available at a host more efficient when the information has actually not has not changed, or avoiding triggering the update altogether. In the examples hash values are used to minimize data processing involved in database updates that need to be performed when the information has not changed or has only partially changed. Various hash functions for accelerating table or database lookup by detecting duplicated records in a large file are known. A hash function applicable in this invention can be any function that can be used to map digital data of arbitrary size to digital data of fixed size. Values returned by a hash function are typically called hash values, hash codes, hash sums, or simply hashes. A hash table can be used for rapid data lookup. Hash functions shall not be often confused with functions such as checksums, check digits, fingerprints, randomization functions, error-correcting codes, and ciphers. Although these concepts may look the same, each has its own uses and requirements and is designed and optimized differently.

Transmission of information over a network can be reduced, and in certain scenario avoided altogether when the information has not changed. The process of database updates can be made more efficient by removing or at least reducing redundant database updates and related handling of data.

A database update can comprise a specific procedure for determining if existing information needs to be replaced by new information. This reduces the CPU (Central Processing Unit) time required to parse data structures in a database that can sometimes be very complex structures. Concurrence control can also be improved. Concurrency control in the process of database update is often complicated task including complex series of database queries and updates.

The structured information can comprise information such as configuration information. In accordance with a possibility the configuration information includes information on authenticators used for securing access and/or connections between hosts and users in an information system.

In the embodiments one or more hash values are computed over all or certain parts of structured information associate with a host. The hash value(s) may be computed by the host, by an interim node or a system processing and storing received structured information. The step of comparing hashes of previously stored structured information and the current structured information can also be implemented at various nodes. Possibilities for the nodes performing the comparing include the host, a system running the database and an interim node.

The computed hash value(s) are compared with hash value(s) computed and/or stored in a database based on previously received and stored structured information. Only those parts of the configuration information whose hash value has changed need to be parsed and updated in a database.

According to one embodiment, the comparison is done at the host. A database can send the host a hash value of structured information stored at the database. One or more hash values can have been saved in a database when earlier structured information is processed. This saved information is then sent to a host. Alternatively, the host may have stored the hash value when it previously sent the structured information to the database for updating.

After having received or otherwise obtained hash value for the currently stored information the host can compute a new hash value of the current structured information for the host. If the newly computed hash value is identical to the hash value of the structured information stored in the database, no database update is needed. If the hashes differ, a process to update the database is triggered. In response thereto the host can send the most recent structured information to the database, thereby causing update of the database with the most recent information. Thus e.g. new configuration information can be sent to a system processing and storing the configuration information centrally only if the information has actually changed. According to a possibility only those parts of the information that have changed are sent. This embodiment has a further advantage of reducing the network traffic required to update the database.

According to an embodiment, comparison of hash values is done at a data processing unit running the database. Hosts can send the most recent hash of structured information to the unit running the database. The unit running the database compares hashes received from the hosts to hashes of the structured information stored in the database for the respective hosts. Hashes of structured information stored in the database can be calculated at this phase, i.e. in response to receiving a new hash from a host.

According to a possibility a hash value can be calculated and stored in a remote database in advance. The hash can be stored in the same database where the structured information is stored. The hash can also be computed at the time of storing. Storing the hash in a database in advance can provide certain advantage, for example in reducing network traffic required to update the database. Calculating the hash of the structured information stored in the database in advance and storing can also benefit in accelerating the process.

If the hashes match, no database update is necessary. If the hashes do not match, the database is updated with the new structured information.

According to a further embodiment there is some flexibility where the hash is computed. The comparison can be done at a processing unit running the remote database based on information from a host. The host can send structured information to the unit running the database whenever there is a change. Optionally, the hash of the structured information may also be sent from the host. If not already received from the host, the unit running the database calculates the hash of the structured information received from the host. The unit also calculates the hash of the structured information stored in the database or retrieves a previously calculated hash of the structured information stored in the database. If the hash of the structured information received from the host matches with the hash of the structured information stored in the database, there is no need for an update of the database. If the hashes do not match, the database is updated with the most recent structured information.

If the information, or relevant part thereof, has not changed, an indication to that effect can be sent from the host. This effectively compresses the sent information using a "same as before" indication.

The database controller can parse the information and update the information and its hash value(s) in the database only if the new configuration information was sent.

Operation in accordance with a couple of exemplifying scenarios are now explained in more detail with reference to flowcharts of FIGS. 1 and 2 and maintaining updated configuration information for a plurality of hosts centrally.

In FIG. 1 flowchart a method of using hash values over a part of configuration information collected from a host to prevent redundant database updates is shown. New configuration information is received from a host at 101. The configuration information may comprise, e.g., one or more of the following: system-wide configuration information for the host, such as one or more IP (Internet Protocol) addresses configured for the host, information about mounted networked file systems on the host (e.g., contents of /etc/fstab), information about user information directories configured for the host (such as NIS (Network Information System), LDAP (Lightweight Directory Access Protocol) directories and Active Directory), information on configuration and related PAM (Pluggable Authentication Modules) configuration, including any filters or restrictions specified on which user accounts exist on the host or where to look for user accounts in the directory, information about local user accounts configured on the host, information about directory accounts recently used on the host, configuration files and host key files for SSH (Secure Shell), host certificate(s) for SSH, web server certificates configured on the host, trusted certificate authorities configured for the host, SSH identity keys configured for one or more user accounts, SSH authorized keys configured for one or more user accounts (including their options, or perhaps the entire contents of relevant authorized keys files), and/or storage encryption keys configured for the host. For private keys, the configuration information may comprise the corresponding public key, a fingerprint derived from the public key, or the private key itself. The configuration information may also comprise log data collected from the host, as well as other information. It is noted that the above are non-exclusive examples and that the configurations information can include only some of the examples mentioned above or any combinations of the exemplifying pieces of information.

A new hash value is determined for the new configuration information at 102. The hash value may be computed on the host or it may be computed from the new configuration information after reception. The hash value may cover the entire configuration information or some part of it. Multiple hash values may be determined for different parts of the configuration information (e.g., a separate hash might be computed for configuration information for each individual user account on the host).

At least one old hash value for the host is read from a database at 103. Several hash values may be read, e.g., one for each individual user account on the host. The at last one old hash value is then compared to the new hash value at 104. At this stage steps 104-106 and possibly 107 may be repeated for each user account on the host.

If the hash values are not the same, the configuration information is parsed at 105 to determine values of one or more configuration parameters, such as IP address of the host, enabled cryptographic algorithms for SSH or any other security protocol, SSH host keys or other authenticators, authorized keys and identity keys for each user account on the host and so on. The values of the configuration parameters are stored in the database at 106. This stage may involve comparing existing parameters with the new parameters to determine which parameters have changed. Such changes, if determined, may trigger further actions. Hash value(s) may also be updated in the database.

If the old and new hash values are the same, parsing and updating information in the database is skipped. If update is considered necessary, the updating includes storing new value of at least one of the configuration parameters.

A timestamp indicating when configuration data has last been received from the host is updated at 107. There could be several separate timestamps, such as one for each user on the host.

Figure 2:
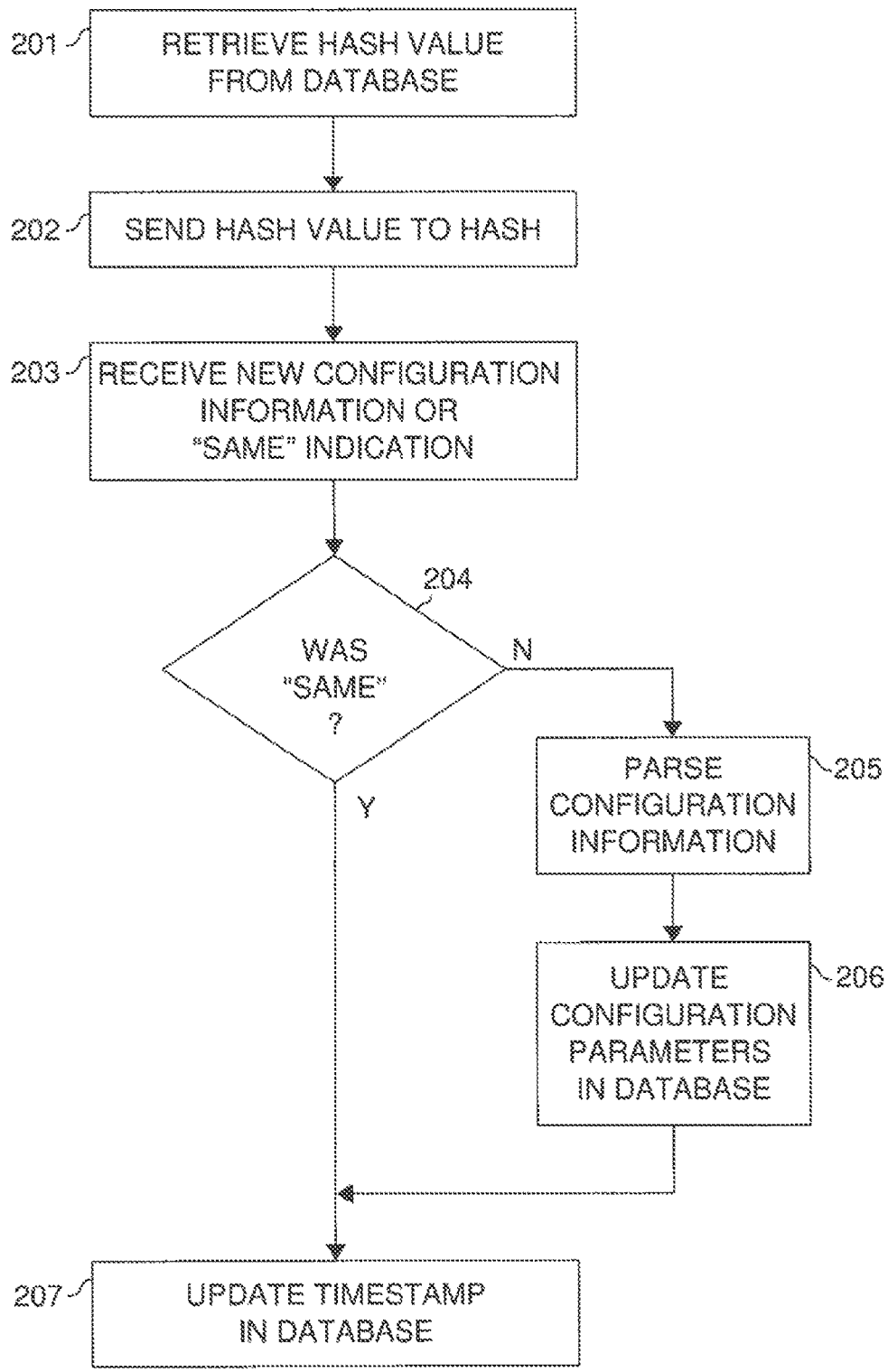
FIG. 2 illustrates using hash values over a part of configuration information collected from a host to prevent redundant transmission of information from the host.

FIG. 2 illustrates using hash values over a part of configuration information collected from a host to prevent redundant transmission of information from the host.

At least one hash value for configuration information on the host is read from a database at 201. The at least one hash value is sent to the host at 202.

New configuration information or an indication that the configuration information or part of it is the same as it was previously is received at 203. If there are multiple hash values for different parts of the configuration information, a separate indication or a new configuration information part can be provided for each such part. If it is determined at 204 that new configuration information is received for a part, the configuration information is parsed at 205 to determine new configuration parameters. The new configuration parameters are then stored and/or updated in the database at 206. One or more hashes may also be updated in the database.

One or more timestamps indicating when information was last received are also updated at 207.

Parsing the configuration information may mean, e.g., determining which authorized keys are configured for each user account. That may be implemented by parsing the authorized keys file. In the case of SSH sample code can be found in OpenSSH source code. The authorized keys are then stored in the database by comparing them to authorized keys already stored in the database for that user account. Missing keys are added and extra keys are deleted (or marked as being no longer existing). Any other actions due to changes in authorized keys are triggered (e.g., logging of the changes).

Figure 3:
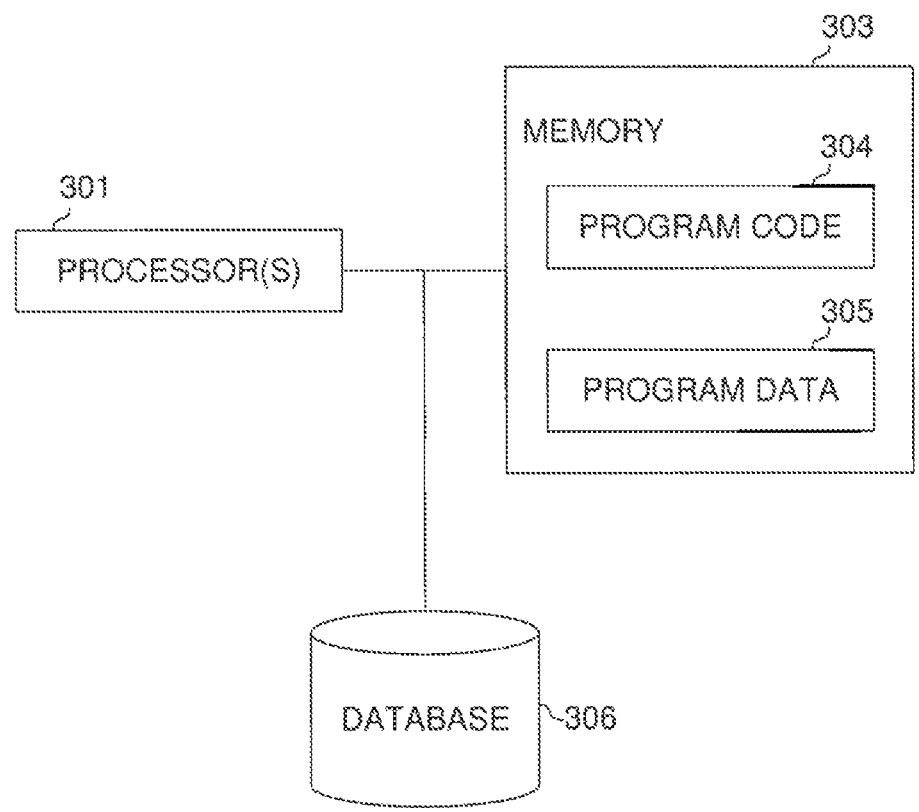
FIG. 3 illustrates an apparatus for using hash values to prevent redundant database updates or data transmissions.

FIG. 3 illustrates an apparatus for using hash values to prevent redundant database updates or data transmissions. One or more processors (301), such as Intel Xeon™ series processors, are connected a non-transient computer-readable memory 303, such as SDRAM, comprising one or more program code means 304 for using hash values for handling received new configuration information and program data 305, and a database 306, such as PostgreSQL™ database, MS SQL™ database, or Oracle™ database.

Examples of non-transitive computer-readable memories include semiconductor memory (e.g., SDRAM, flash, memristor memory), magnetic memory (e.g., hard disk), optical disk (e.g., DVD), and networked server (e.g., file server or web server) providing access to data stored in non-transitive computer-readable memory on the server over a network.

Figure 4:
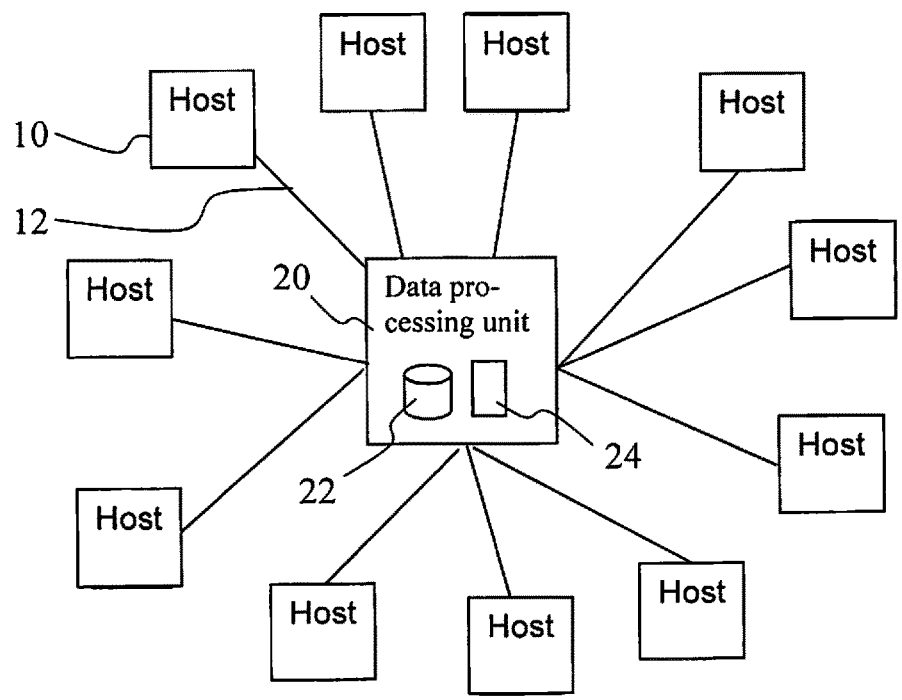
FIG. 4 illustrates an example of a computer system where the invention can be embodied.

FIG. 4 shows an example for a system where configuration information for a plurality of host devices 10 is collected by a device 20. The data collection can take place over data links 12. The device 20 collecting and storing the configuration information can comprise at least on database 22 and at least one processor apparatus for controlling the operation of the device. As explained above, the various stages of processing can take place at the hosts or the central data processing unit comprising the database, or be distributed between them.

Figure 5:
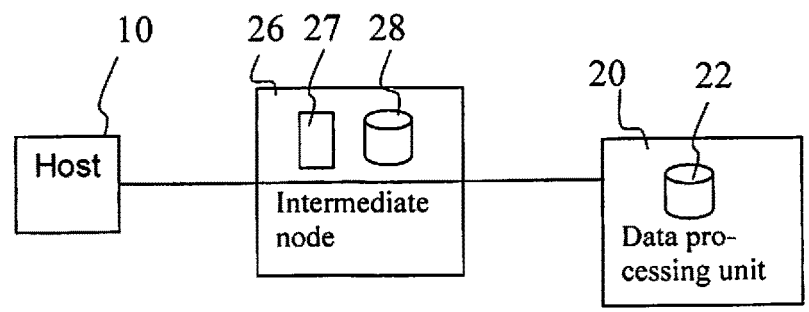
FIG. 5 illustrates another example of a computer system where the invention can be embodied.

FIG. 5 shows an example of a system where comparison of hash function is done in a node 26 separate from the host 10 and a data processing unit 20 running the database 22. The separate unit can be e.g. an interim node adapted for capturing data communicated between hosts and a central database. The node can comprise appropriate data processing apparatus 27 and memory facility 28 to accomplish the data capture and hash comparison operations.

Figure 6:
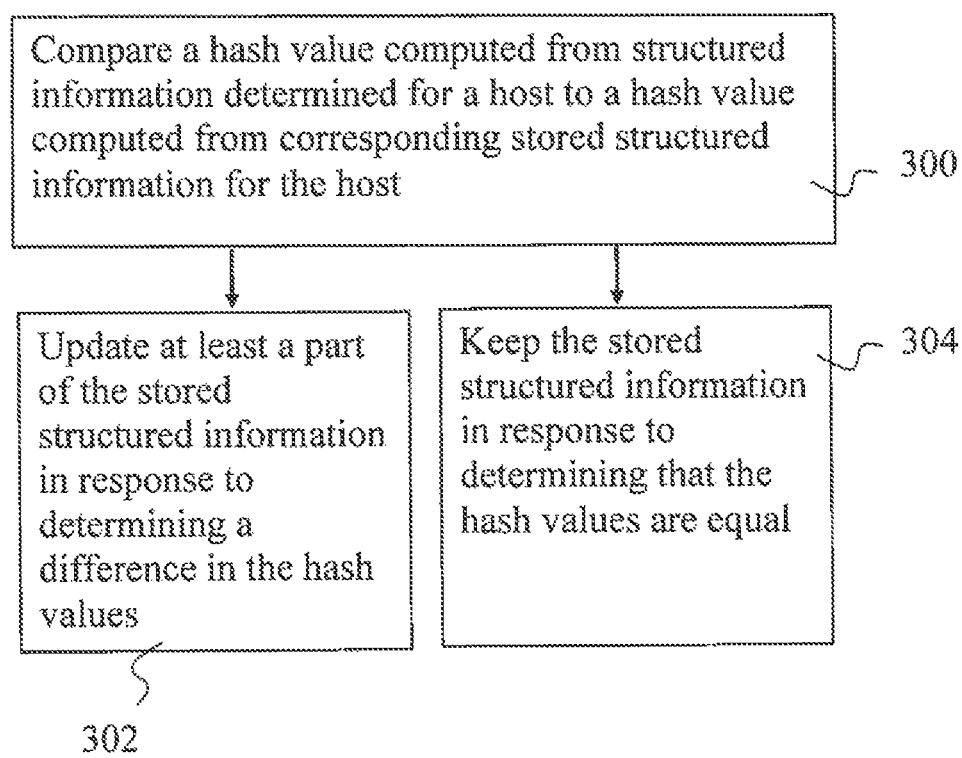
FIG. 6 illustrates a flowchart according to an embodiment.

FIG. 6 shows a flowchart for a method in accordance with the herein disclosed principles. In the method a hash value computed over structured information determined for a host is compared at 300 to a hash value computed over a corresponding stored structured information for the host. Following the comparison, update of at least a part of the stored structured information can be caused at 302 in response to determining a difference in the hash values. The stored structured information can be kept at 304 as it is in response to determining that the hash values are equal.

In accordance with an embodiment a computer program embedded in a non-transitory computer readable storage medium and comprising program code means adapted for processing one or more of the steps described herein is provided. The computer code can be adapted to compare a hash value computed over structured information determined for a host to a hash value computed over a corresponding structured information stored in a remote database for the host. The computing may be by the computer code, or by a another computer code running in another node. The computer code can then cause update of at least a part of the stored structured information in response to determining a difference in the hash values or refrain from the update and keep the stored structured information in the database in response to determining that the hash values are equal.

The aspects of the embodiments of the invention may be combined to form new aspects and embodiments. Steps may be performed in any reasonable order, and steps may be omitted or other steps added.

While certain information has been described as being stored in a database, it could equivalently be stored in two or more databases, such as one type of information being stored in one database and another kind of information in another database. Such split databases are still considered a single database for the purposes of this specification.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. All such and similar modifications of the teachings of this invention will still fall within the spirit and scope of this invention as defined in the appended claims. Indeed there is a further embodiment comprising a combination of one or more of any of the other embodiments previously discussed.

The invention claimed is:

1. A method of managing a remote database for centrally storing configuration information for a plurality of hosts in a data network, the method comprising:

receiving, by a network device separate from the hosts and comprising a processing unit configured to manage the remote database, configuration information comprising information about user information directories configured for a host;

preventing redundant database updates of configuration information comprising information about user information directories configured for the host stored in the remote central database by comparing, by the processing unit of the network device, a hash value computed over the received configuration information for the host to a hash value computed over a corresponding configuration information stored in the remote database for the host;

wherein the method further comprises one of:

causing, by the processing unit of the network device, update of at least a part of the stored configuration information in response to determining, by the processing unit of the network device, a difference in the hash values, and keeping the stored configuration information in the remote database in response to determining, by the processing unit of the network device, that the hash values are equal.

2. The method of claim 1, wherein the configuration information comprises at least one authenticator.

3. The method of claim 2, wherein the at least one authenticator comprises a secure shell (SSH) key and the configuration information comprises at least one configuration file for SSH.

4. The method of claim 1, wherein the network device comprises the remote database, the method further comprising:
receiving the configuration information for the host in the processing unit of the network device comprising the remote database;
computing, by the processing unit of the network device comprising the remote database, a hash value over the received configuration information for the host; and
comparing the hash values of the received and stored configuration information by the processing unit of the network device comprising the remote database.

5. The method of claim 1, wherein the network device comprises a node separate from the host and the remote database, the method comprising:
computing, by the processing unit of the network device separate from the host and the remote database, a hash value over the received configuration information for the host; and
comparing the hash values of the received and stored configuration information by the processing unit of the network device separate from the host and the remote database.

6. The method of claim 1, further comprising:
retrieving the hash value for the comparison from the remote database, and
storing in the remote database a new hash value computed over the configuration information in response to determination that the hash values differ.

7. The method of claim 1, wherein the configuration information comprises information about at least one of Internet Protocol (IP) addresses configured for the host, networked file systems mounted on the host, local user accounts configured on the host, a system-wide configuration for the host, at least one certificate associated with the host, at least one cryptographic key configured for a user account on the host, all collected configuration information for at least one user account on the host, all authorized keys configured for the host, at least one cryptographic key configured for a user account on the host, the cryptographic key being an identity key or an authorized key for a user account, at least one Kerberos credential for the hosts, and at least one host-based authentication configuration file of at least one user account of the host.

8. The method of claim 1, further comprising updating a timestamp indicating when configuration information was last received from the host.

9. The method of claim 1, further comprising:
performing full parsing of the configuration information stored in the remote database only in response to determining by the processing unit of the network device that the hash values differ.

10. An apparatus for a network device configured to manage a database for centrally storing configuration information comprising information about user information directories configured for a plurality of remote hosts in a data network, the apparatus comprising at least one processor, and at least one memory including computer program code, wherein the at least one memory and the computer program code are configured, with the at least one processor, to:
receive configuration information comprising information about user information directories configured for a remote host;
compare a hash value computed over the received configuration information for the remote host to a hash value computed over a corresponding configuration information comprising information about user information directories configured for the remote host and stored for the remote host in the database to prevent redundant database updates of centrally stored configuration information in the database; and
cause update of at least a part of the configuration information stored in the database based on configuration information comprising information about user information directories configured for the host received from the hosts in response to determination of a difference in the hash values, and
keep the stored configuration information in the database in response to determination that the hash values are equal.

11. The apparatus of claim 10, wherein the configuration information comprises information about at least one of IP addresses configured for the remote host, networked file systems mounted on the remote host, local user accounts configured on the remote host, a system-wide configuration for the remote host, at least one certificate associated with the remote host, at least one cryptographic key configured for a user account on the remote host, all collected configuration information for at least one user account on the remote host, all authorized keys configured for the remote host, at least one cryptographic key configured for a user account on the remote host, the cryptographic key being an identity key or an authorized key for a user account, at least one Kerberos credential for the remote host, and at least one host-based authentication configuration file of at least one user account of the remote host.

12. The apparatus of claim 10, wherein the at least one memory and the computer program code are further configured to update a timestamp indicating when configuration information was last received by the network device from the remote host.

13. A network device for a computer network system wherein configuration information comprising information about user information directories configured for a plurality of hosts each separate from the network device is centrally stored in a remote database, the network device comprising at least one processor, and at least one memory including computer program code, wherein the at least one memory and the computer program code are configured, with the at least one processor, to:
manage storage of configuration information comprising information about user information directories configured for the hosts in the remote database;
receive configuration information comprising information about user information directories configured for a host;
compare a hash value computed over the received configuration information for the host to a hash value computed over a corresponding configuration information comprising information about user information directories configured and stored for the host in the remote database to prevent redundant database updates of centrally stored configuration information comprising information about user information directories configured for the hosts in the remote database; and cause, in response to determination of a difference in the hash values, update of at least a part of the stored configuration information for the hosts in the remote database based on the received configuration information for the host, and refrain, in response to determination that the hash values are equal, from triggering an update of the stored configuration information in the remote database.

14. The network device of claim 13, comprising a node that is separate from the remote database.

15. The network device of claim 14, wherein the at least one memory and the computer program code are further configured to receive the hash value computed over the stored configuration information from the database and compute the hash value over the received configuration information for the host.

16. The network device of claim 13, wherein the at least one memory and the computer program code are further configured to store configuration information for the host in the network device separate from the host and comprising the remote database;

compute the hash value for the received configuration information for the host; and compare the hash values of the received and the stored configuration information.

17. The network device of claim 13, wherein the at least one memory and the computer program code are further configured to send to the database an indication that the hash values equal or an indication that the hash values are not equal.

* * * * *